United States Patent [19]
Ingram et al.

[11] 3,954,305
[45] May 4, 1976

[54] ACTUATOR ASSEMBLIES FOR VEHICLE BRAKES

[75] Inventors: Brian Ingram, Balsall Common; David Anthony Harries, Shirley, both of England

[73] Assignee: Girling Limited, Birmingham, England

[22] Filed: Sept. 10, 1973

[21] Appl. No.: 395,557

[30] Foreign Application Priority Data
Sept. 26, 1972 United Kingdom............... 44311/72
May 23, 1973 United Kingdom............... 24732/73

[52] U.S. Cl. .............................. 303/21 F; 188/170; 303/10; 303/13; 303/21 AF
[51] Int. Cl.² ......................................... B60T 8/06
[58] Field of Search ................. 303/21 F, 13, 21 AF, 303/61–63, 68–69, 10; 188/181 A, 170

[56] References Cited
UNITED STATES PATENTS

| | | | |
|---|---|---|---|
| 3,547,234 | 12/1970 | Cummins et al..................... | 188/170 |
| 3,613,839 | 10/1971 | MacDuff............................. | 188/170 |
| 3,659,905 | 5/1972 | Goulish ............................. | 303/21 F |
| 3,722,960 | 3/1973 | Menar ............................. | 303/21 AF |
| 3,724,915 | 4/1973 | MacDuff............................. | 303/21 F |
| 3,767,271 | 10/1973 | Grosseau............................ | 303/21 F |
| 3,788,710 | 1/1974 | Grunberg et al. .................. | 303/21 F |

*Primary Examiner*—Trygve M. Blix
*Assistant Examiner*—Douglas C. Butler
*Attorney, Agent, or Firm*—Scrivener Parker Scrivener and Clarke

[57] ABSTRACT

An actuator assembly for a vehicle brake includes three axially aligned pistons, a first actuating piston for applying the brake hydraulically during normal service braking; a modulator piston movable for antiskid purposes between a first position in which an inlet valve controlling the supply of fluid to the first actuating piston is open, and a second position in which the inlet valve is closed; and a second actuating piston resiliently urged through the modulator piston to engage the first actuating piston to apply the brake for parking purposes but normally held out of engagement by fluid pressure in a chamber formed between the modulator piston and the second actuating piston, the pressure in the chamber also holding the modulator piston in the first position.

19 Claims, 13 Drawing Figures

FIG.1.

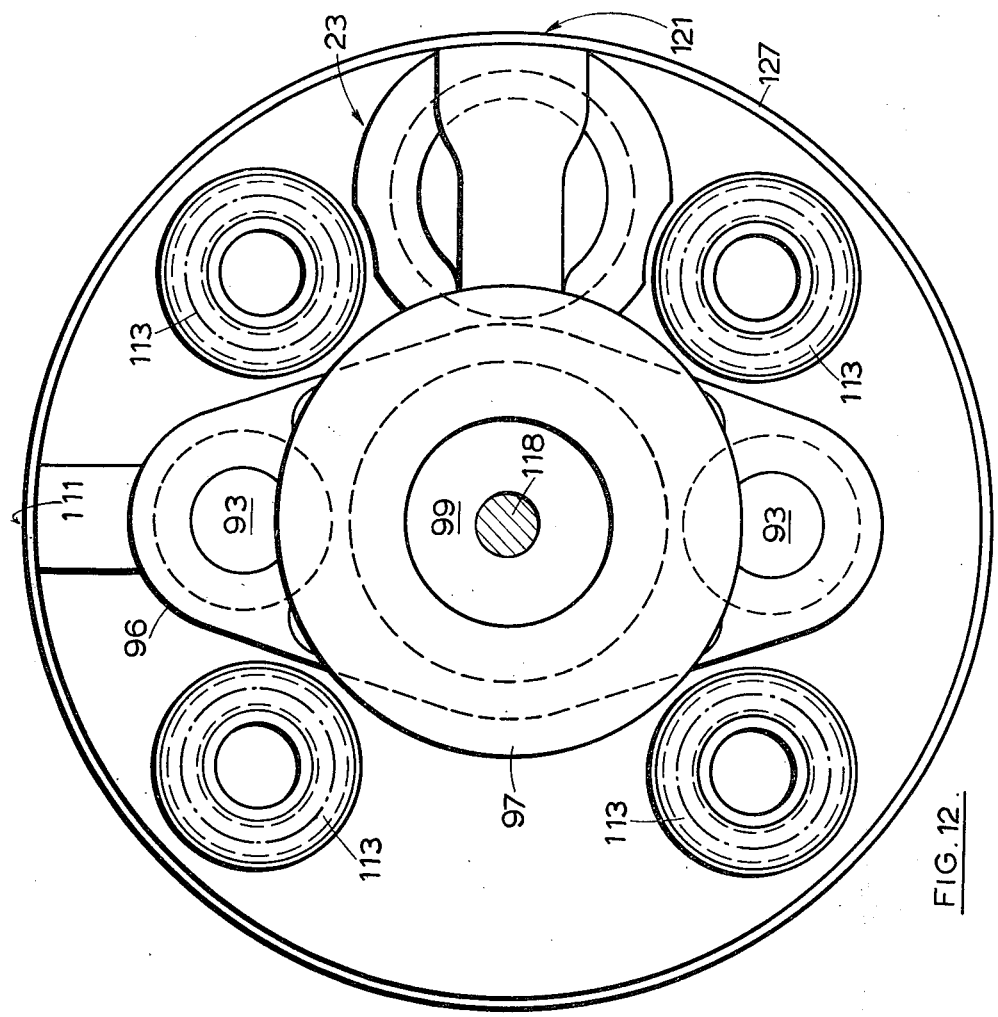
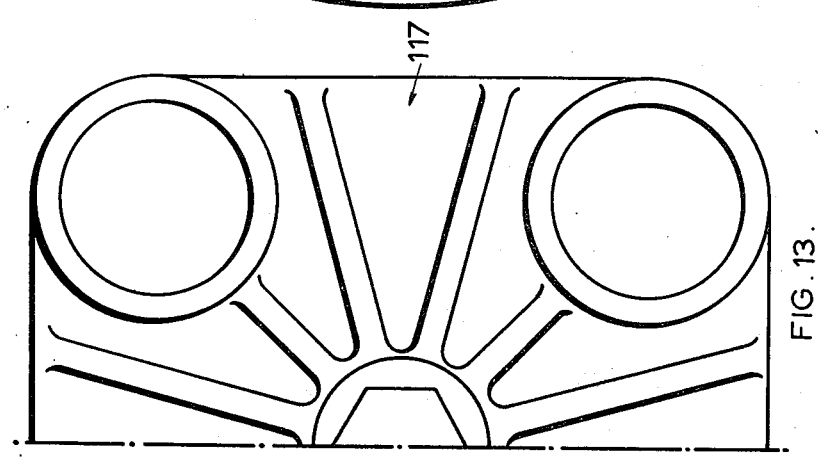
FIG. 12.
FIG. 13.

ACTUATOR ASSEMBLIES FOR VEHICLE BRAKES

This invention relates to actuator assemblies for vehicle brakes, the actuator assemblies being of the kind comprising a first actuating member adapted to apply a brake, means for subjecting the first actuating member to fluid pressure to apply the brake, a second actuating member spring biassed to engage the first actuating member to apply the brake, and means for subjecting the second actuating member to fluid pressure to hold it out of engagement with the first member.

Usually in braking systems using actuator assemblies of this kind, a pedal operated valve or master cylinder supplies fluid under pressure to the first actuating member for servicing braking, and a hand-operated valve controls a supply of fluid under pressure which normally compresses the spring biassing the second actuating member, operation of the valve releasing the fluid to apply the brake for parking purposes.

In anti-skid braking systems it is usual to supply fluid for service braking to an actuator through a separate modulator which is arranged to modulate the pressure applied to the actuator in the event of a skid.

According to the present invention an actuator assembly of the kind set forth includes means for modulating the fluid pressure acting on the first actuating member. Thus in an anti-skid braking system a separate modulator is not required.

Preferably the actuator assembly comprises a housing having an inlet for connection to a supply of fluid under pressure to apply the first actuating member, an inlet valve controlling said inlet, a modulator piston assembly movable in between a first position in which the inlet valve is open and second position in which the inlet valve is closed, means for subjecting the modulator piston assembly to fluid pressure to urge it into the first position and means for subjecting the modulator piston to fluid pressure to urge it into the second position.

Conveniently the modulator piston assembly includes a piston having a stepped through bore in which works a stepped piston forming the second actuating member, the arrangement being such that pressure fluid introduced into the chamber formed between the pistons urges the modulator piston into the first position and urges the second actuating piston away from the first actuating member to compress the spring.

The actuator assembly may include a control valve controlling communication between the first chamber and a second chamber in the housing on the opposite side of the modulator piston, in a vehicle, the control valve being responsive to the decelerations of a braked wheel of the vehicle.

A pressure space defined in the housing adjacent to the first actuating member is connected to the inlet and to a cylinder bore in which the modulator piston assembly is movable, movement of the piston assembly to the second position increasing the effective volume of the pressure space to relieve the braking pressure.

The modulator piston assembly may comprise a first modulator piston defining the first chamber and acting on a second modulator piston movable in the bore communicating with the third chamber.

The first and second modulator pistons may be separate and movable in parallel bores in the housing. Alternatively they may move in axially aligned bores. In one construction they are combined as a stepped piston.

Preferably the first actuating member is also a piston. Conveniently this first actuating piston is axially aligned with the first modulating piston and the second actuating piston.

The spring biassing the second actuating member may be a single spring or a plurality of angularly spaced springs.

Preferably the spring acts on a member having an adjustable connection with the second actuating member whereby the brake can be released after a pressure fluid failure.

Two embodiments of actuator assemblies according to this invention are illustrated in the accompanying drawings, in which:

FIG. 12 is a section on the lines 12—12 in FIG. 9; and

FIG. 13 is a view of half the plate at the end of the assembly opposite to the end shown in FIG. 8.

Figure 1:
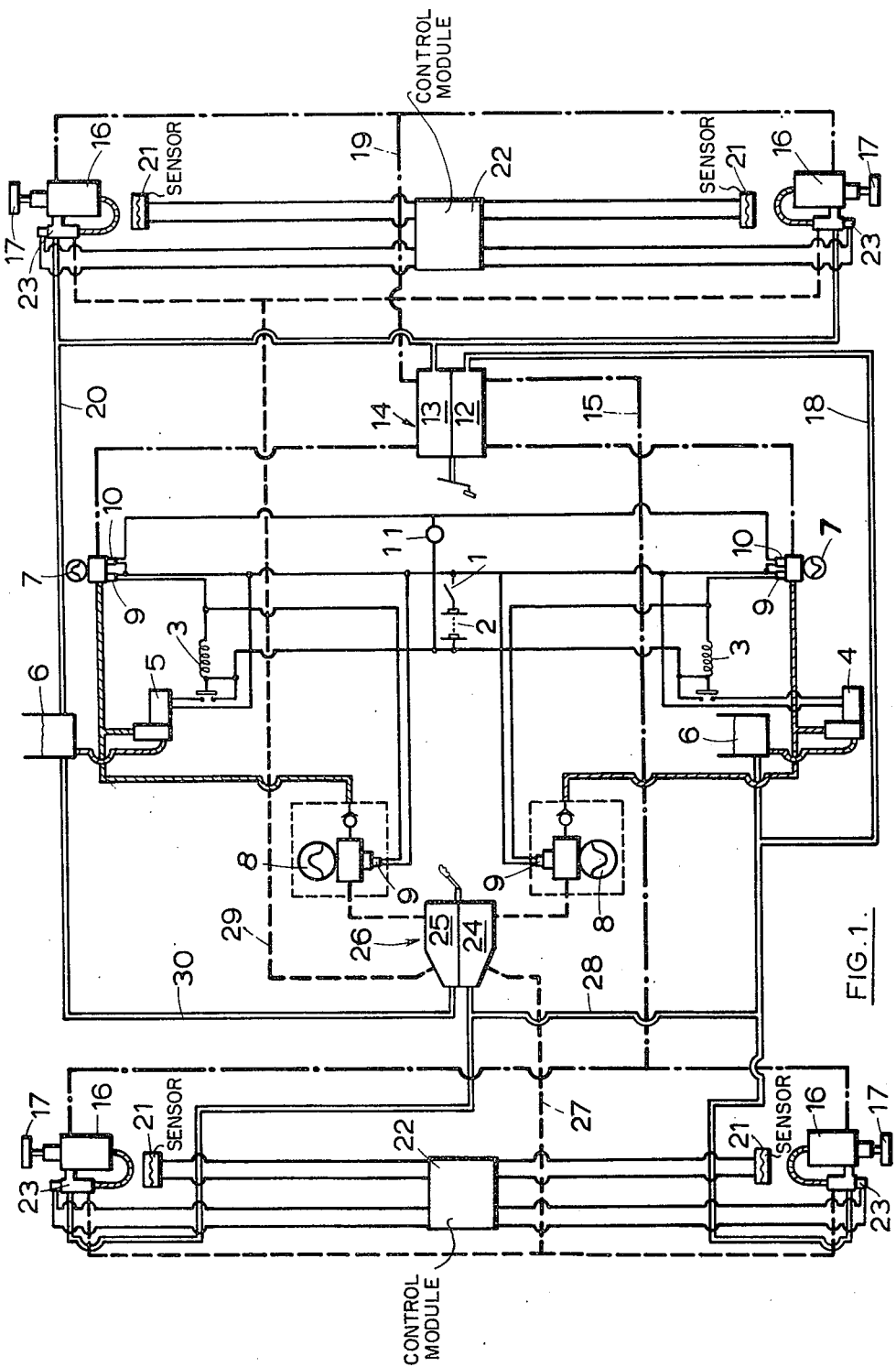
FIG. 1 is a layout of an hyraulic braking system including the actuator assemblies.

In the layout illustrated in FIG. 1 the vehicle ignition switch 1 is connected to an electrical circuit including the vehicle battery 2 two relays 3, a pump 4 supplying pressure fluid for the front brakes and a pump 5 supplying pressure fluid for the rear brakes. Each pump 4 and 5 draws hydraulic fluid from a reservoir 6 and supplies an accumulator 7 for pressure braking fluid and an accumulator 8 for skid control fluid. Each accumulator 7 and 8 is provided with a pressure switch 9 for operating the pumps 4 and 5 to maintain a predetermined pressure in the accumulator. The accumulator 8 can be arranged to be at a lower pressure than the accumulators 7. The accumulators are also provided with low pressure warning switches 10 connected in a circuit with a warning device, such as lamp 11.

Each accumulator 7 is connected to one of two separate pressure spaces 12 and 13 in a pedal-operated dual control valve 14. The pressure space 12 is connected through pipeline 15 to actuator assemblies 16 for actuating front wheel brakes 17 and is connected through pipeline 18 to reservoir 6 for pump 4. The pressure space 13 is connected through pipeline 19 to actuator assemblies 16 for actuating rear wheel brakes 17 and is connected through pipeline 20 to the second reservoir 6. On operation of the control valve 14 connections to the reservoir lines 18 and 20 are closed and pressure fluid is supplied to the actuator assemblies 16 through lines 15 and 19.

When the brakes are applied the deceleration of each wheel is sensed by an sensor 21. The outputs from the sensors 21 on the front wheels and the rear wheels respectively are fed into control modules 22. When the output from one sensor 21 exceeds a predetermined threshold value its control module 22 converts the output into a signal which is supplied to a solenoid control valve 23 for an actuator assembly 16 associated with that control module.

Each accumulator 8 is connected to one of two separate pressure spaces 24 and 25 in a hand-operated dual control valve 26. The pressure space 24 is connected through pipeline 27 to solenoid control valves 23 for the front wheels and is connected through pipeline 28 to reservoir 6 for pump 4. The pressure space 25 is connected through pipeline 29 to solenoid control valves 23 for the rear wheels and is connected through pipeline 30 to the second reservoir 6. On operation of control valve 26 connections to be pipelines 27 and 29 are closed and pressure fluid from solenoid control valves 23 is exhausted to reservoirs 6 through pipelines 28 and 30.

Each solenoid control valve 23 is adapted to control the supply of hydraulic fluid from an accumulator to an actuator assembly 16 for modulating the braking effort applied to the wheel brake by the actuator assembly in response to the signal received from the control module 22 to which the solenoid is connected.

Figure 2:
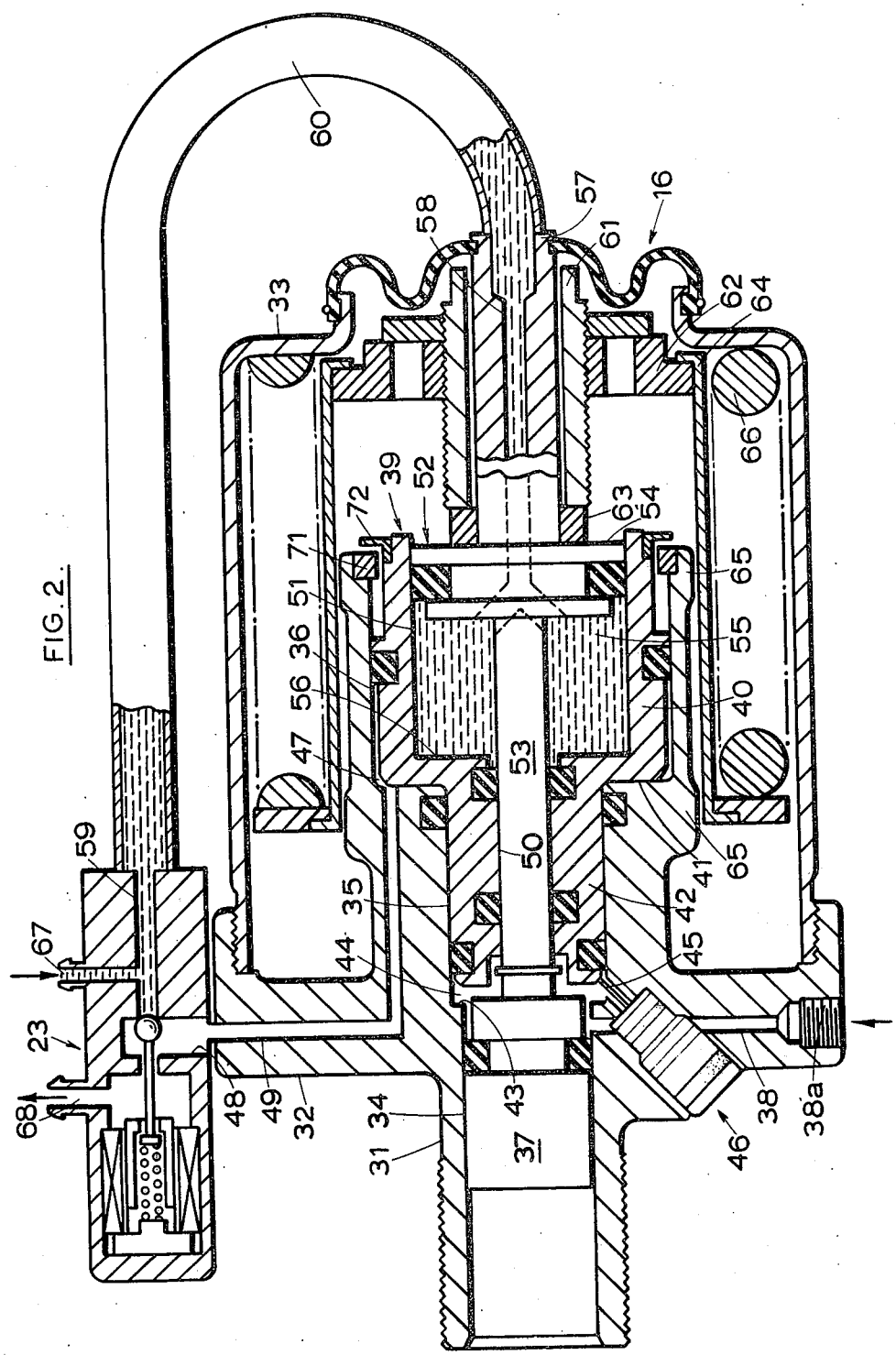
FIG. 2 is a longitudinal section through a first embodiment of the actuator assembly included in the system of FIG. 1.

The actuator assembly 16 of FIG. 1 is shown in more detail in FIG. 2 and comprises a two-part housing, a substantially cylindrical body 31 having a radial flange 32, and a sleeve 33 screwed to the flange 32 to surround the body. The body is formed with a through bore having three stepped bore portions 34, 35 and 36 of progressively increasing diameter. The smallest bore portion 34 terminates at one end of the body which is adapted to be secured to a wheel brake or to a slave cylinder of a wheel brake. An actuating piston 37 (the first) works in bore portion 34 and is adapted to be connected to the operating member of a wedge brake or to pressurize fluid in a slave cylinder. A radial passage 38 through the flange 32 leads from the bore portion 34 to an inlet port 38a for connection to one of the pipe lines 15 or 19 from the pedal-operated dual control valve 14.

A stepped modulator piston 39 works in the bore portions 35 and 36 and is arranged such that when the inner end of the piston portion 40 of greater diameter is in abutment with the step 41 at the change in diameter of the cylinder bore, the lesser diameter piston portion 42 is spaced from the step 43 at the change in diameter between bore portions 34 and 35. A pressure space 44 is formed at the step 43 and the spring-loaded valve member 45 of an inlet valve 46 controlling passage 38 extends through an inclined drilling to chamber 44. When the modulator piston 39 is in a dwell condition to abutment with step 41, piston portion 42 engages valve member 45 to hold the inlet valve 46 open. When the modulator piston retracts from the dwell condition valve 46 closes cutting off the supply of pressure fluid to chamber 44.

A second chamber 47 is formed at the step 41 and is connected to an outlet port 48 in control valve 23 through a passage 49 extending axially through body 31 and then radially through flange 32.

The modulator piston 39 itself has a stepped axial bore, the smaller bore portion 50 in the piston portion 42 and the larger diameter bore portion 51 in the piston portion 40. A stepped second actuating piston 52 works in this stepped bore, the smaller diameter portion 53 terminating in the first chamber 44 and the larger diameter portion 54 closing a a chamber 55 (first) formed at the step 56 between the bore portions 50 and 51.

An axial rod 57 extends outwardly from the second actuating piston 52 and an axial passage 58 through the rod 57 and piston 52 leads into chamber 55. The outer end of passage 58 is connected to a transfer port 59 in solenoid valve 23 by a flexible hose 60. The rod 57 is slidably guided in a tube 61 screwed into an end plate 62 and a thrust washer 63 on the rod 57 acts between the tube 61 and piston 52. End plate 62 is secured to a cage 64 which surrounds body 31 and slides on bearing surfaces 65 on the exterior of body 31. A spring 66 acts between cage 64 and housing sleeve 33.

The solenoid control valve 23 has an inlet port 67 directly connected to the transfer port 59 and adapted to be connected to lines 27 or 29 from the hand operated dual control valve 26. The valve 23 also has a reservoir port 68 for connection to reservoir line 28 or 30.

Figure 3:
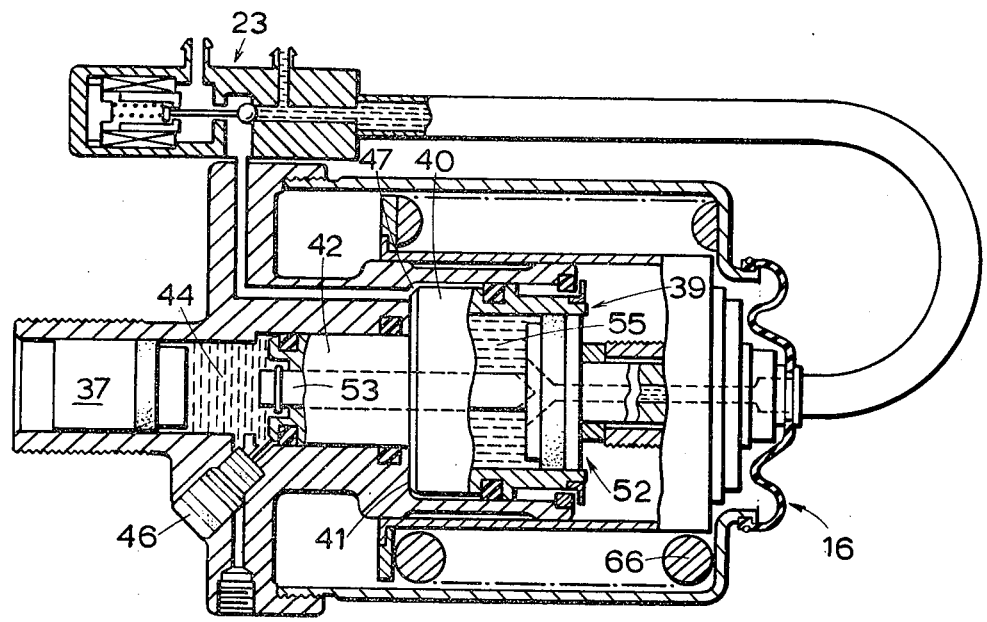
FIGS. 3 to 6 are sections similar to FIG. 2 showing the actuator assembly in different operational positions.

During normal operation with the hand brake off the relative positions of the parts of the actuator assembly are as shown in FIG. 2, pressure fluid in chamber 55 keeping the second actuator piston 52 retracted in opposition to the force in spring 66 and keeping the modulator piston 39 in abutment with step 41. On operation of the pedal valve 14 pressure fluid is supplied to the pressure space 44 to advance the first actuating piston 37 to apply the wheel brake as shown in FIG. 3.

Figure 4:
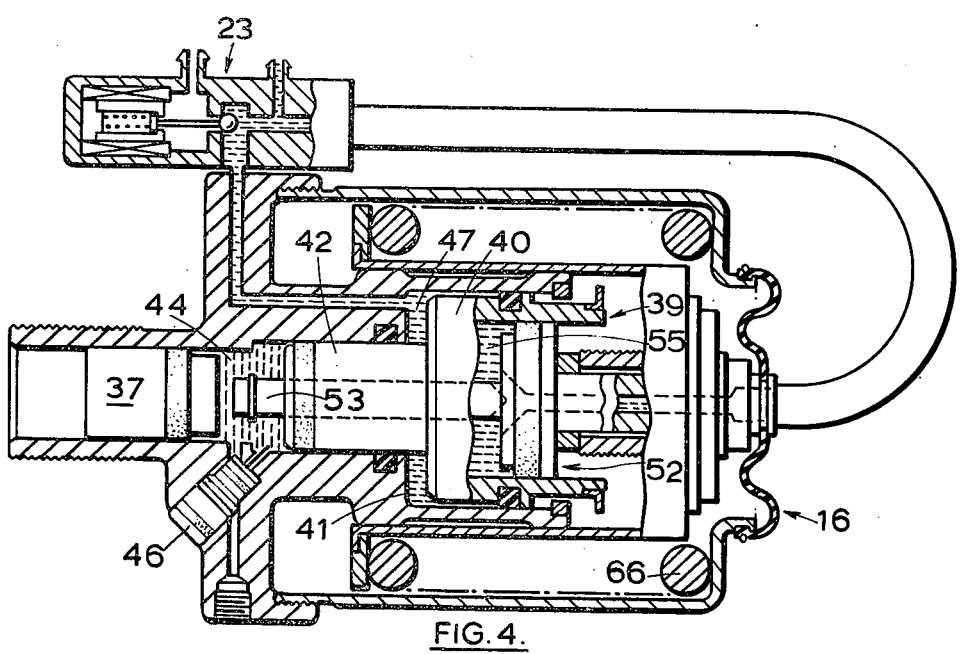

When the deceleration of a wheel exceeds the predetermined threshold value the solenoid of valve 23 is energized to close the connection between second chamber 47 and reservoir, and to allow pressure fluid from chambers 55 and accumulator 8 into chamber 47. Modulator piston 39 retracts as the differential pressure across the piston portion 40 is equalized and the braking pressure in chamber 44 acts on the exposed end of piston portion 42. Conveniently the area of piston portion 40 exposed to the pressure in chamber 47 is greater than the area exposed to the pressure in chamber 55. Also the second actuator piston 52 advances into chamber 44 so the actuator assembly assumes the position shown in FIG. 4. Pressure in chamber 55 is sufficient to limit forward movement of the piston 52. Inlet valve 46 shuts to isolate chamber 44 from the applied pressure and since the volume of the modulator piston is greater than the volume of the second actuating piston, the pressure in chamber 44 falls and the first actuating piston 37 retracts to relieve the braking force.

Figure 5:
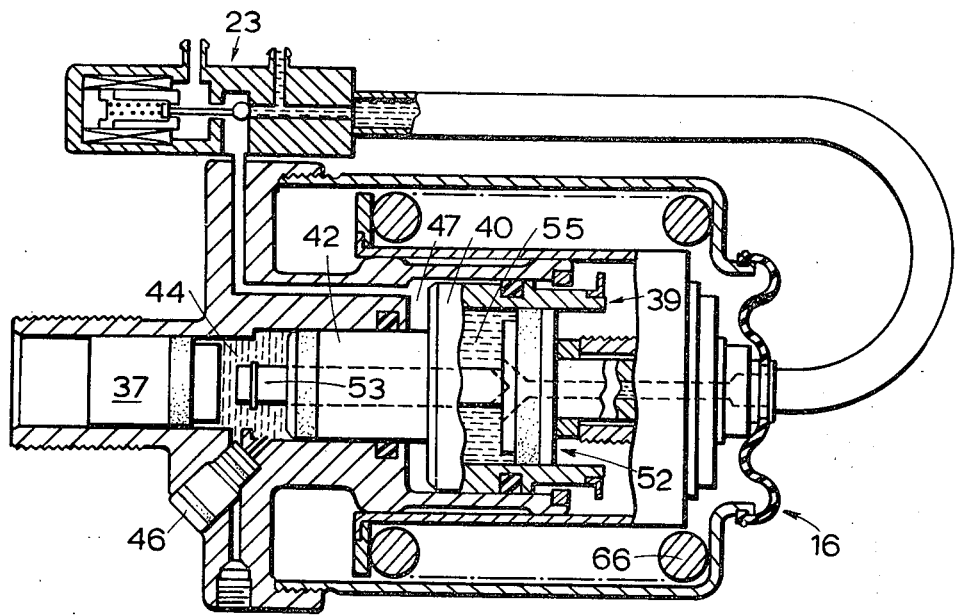

FIG. 5 shows the solenoid valve 23 shut as the skid signal terminates, exhausting chamber 47 to reservoir and allowing chamber 55 to repressurize.

Figure 6:
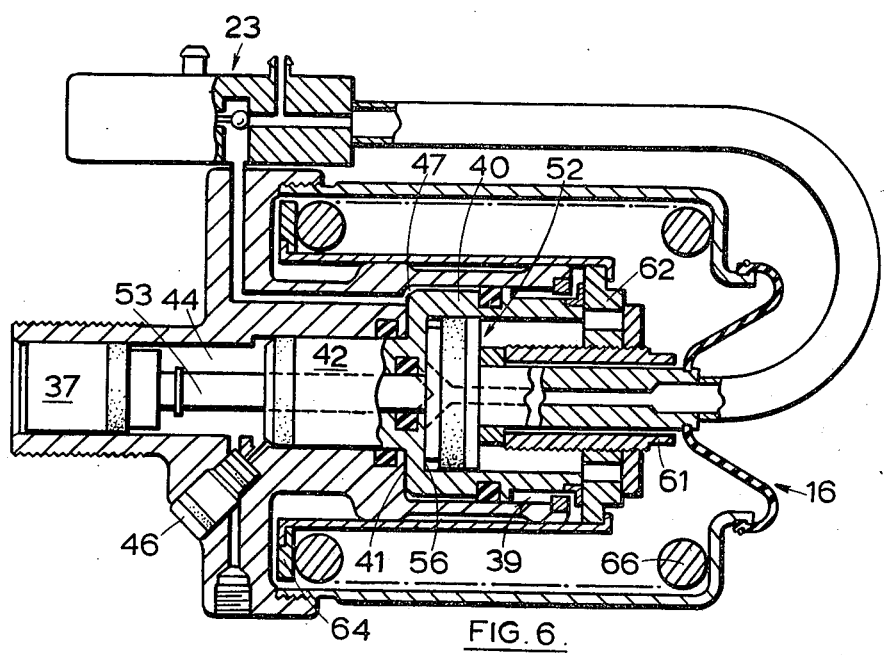

On operation of the hand valve 26, chamber 55 is exhausted to reservoir and spring 66 advances cage 64, end plate 62, tube 61 and second actuating piston 52 until piston 52 abuts step 56, also keeping the modulator piston 39 in abutment with step 41. As shown in FIG. 6, the second actuating piston 52 engages the first actuating piston 37 to hold it in a brake applied position. The position of FIG. 6 will occur on failure of the fluid supply in accumulator 8. The brake can be released by unscrewing tube 61 from plate 62.

Figure 7:
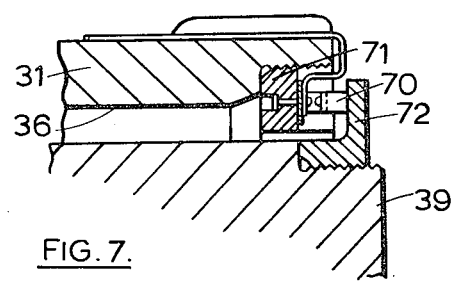
FIG. 7 is an enlarged detail of FIG. 2.
Figure 8:
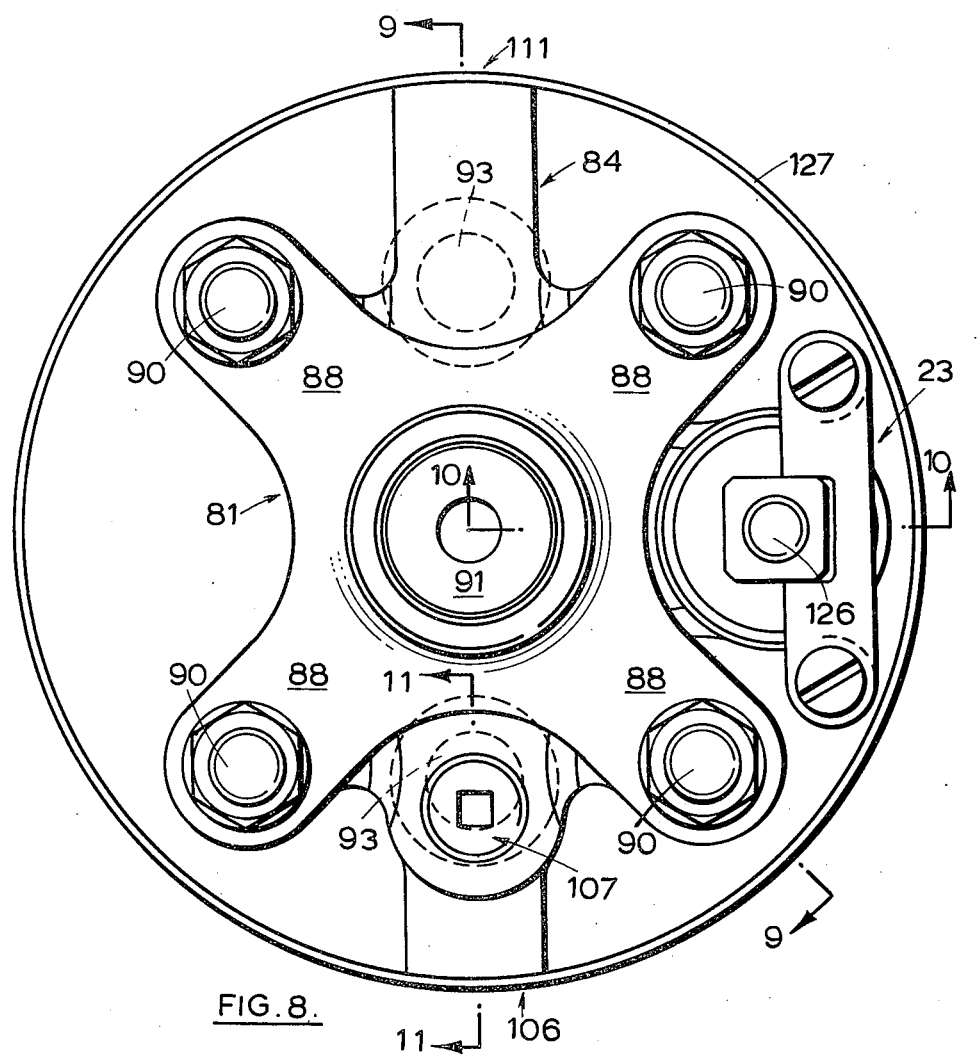
FIG. 8 is an end view of a second embodiment of the actuator assembly.

In our U.S. Pat. No. 3,843,209 we disclose an electrical switch arranged between two parts of a modulator which move relatively to each other when the modulator is actuate, movement of the parts operating the switch. In FIG. 7 is shown a switch 70 of well known type located in an annular ring 71 in the end of the body 31 of the actuator assembly surrounding the bore portion 36. An annular L section ring 72 in the end of the modulator piston 39 serves as a bridging piece for the switch contacts. The function of the Switch 70 is set out in the above Patent.

The second embodiment of the actuator assembly shown in FIGS. 8–13 has a two-part housing, a substantially cylindrical first part 81 having a stepped through bore 82, 83 and a second part 84 also having a stepped through bore 85, 86, the larger diameter bore 85 receiving one end of the first housing part 81. A radial flange 87 around the housing part 81 acts as an abutment for the housing part 84 and is shaped to provide four angularly spaced radial arms 88 which register with four arms 89 extending radially from housing part 84. A bolt 90 through each pair of arms 88, 89 serves to clamp the two housing parts together.

An actuating piston 91 works in the larger diameter bore 82 of the housing part 81 which is adapted to be secured to a wheel brake, the piston 91 being connected to the operating member of the brake.

On each side of the bore 86 in the second housing part 84 are two blind bores 92 arranged so that the axes of the bores are parallel and co-planar. In each of the blind bores 92 works a modulator piston 93 (the second) which extends through a seal 94 housed in a counterbore in a plane face of the housing and through a corresponding hole 95 in a seal retaining plate 96 secured to the housing. The ends of the modulator pistons 93 are engaged by a radial flange 97 extending from a modulator piston 98 (the first) working in the lesser diameter bore 86 in housing part 84.

A stepped second actuating piston 99 works in a correspondingly stepped bore 100, 101 in the (second) modulator piston 98, the lesser diameter bore 100 being of the same diameter and coaxial with the bore 83 in the housing part 81. Two seals 102 in a counterbore of bore 83 are held apart by a spacer 103 secured to the housing by grub screw 100 provided with an axial bleed passage 105.

Figure 9:
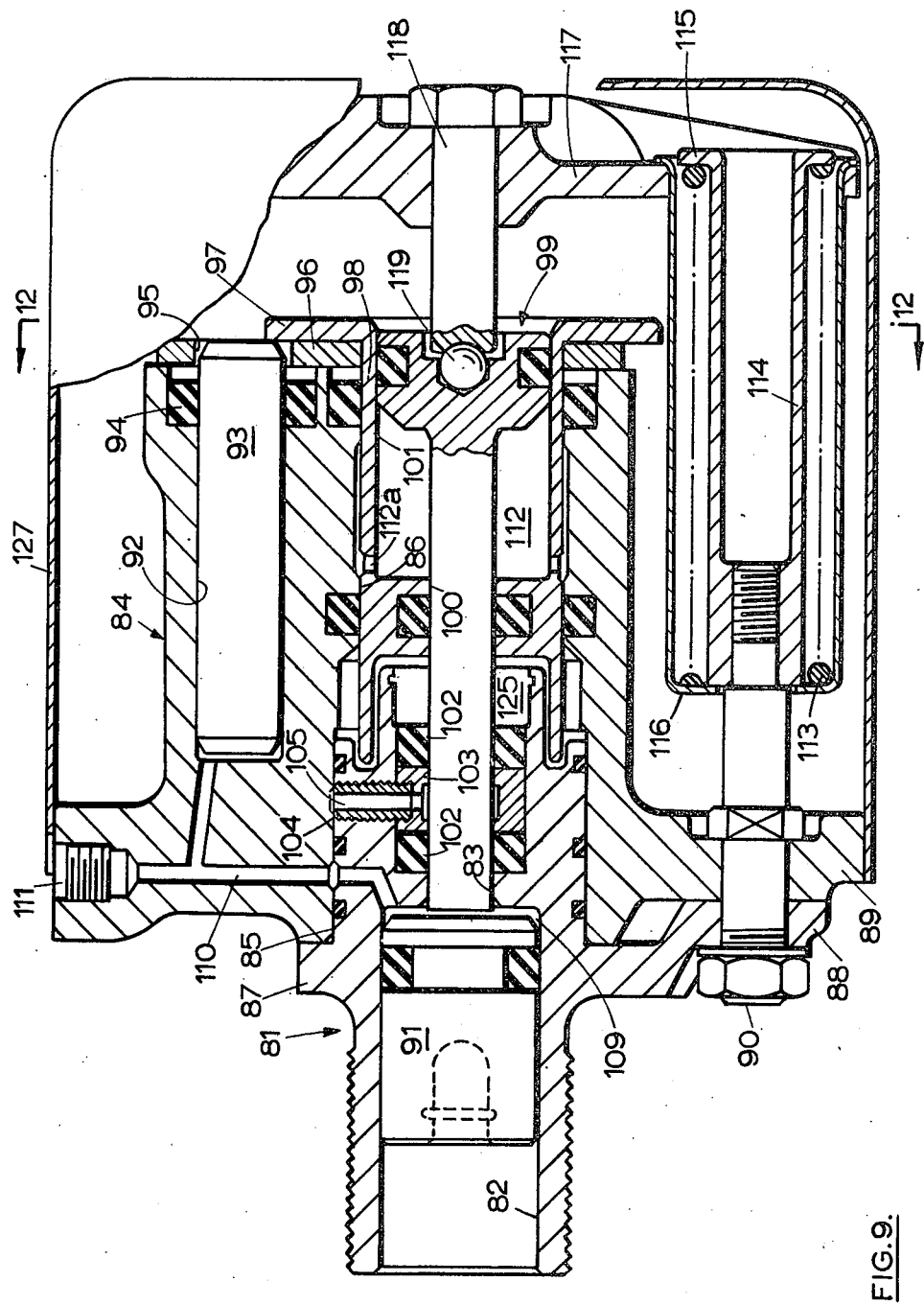
FIG. 9 is a section on the lines 9—9 of FIG. 8.
Figures 10, 11:
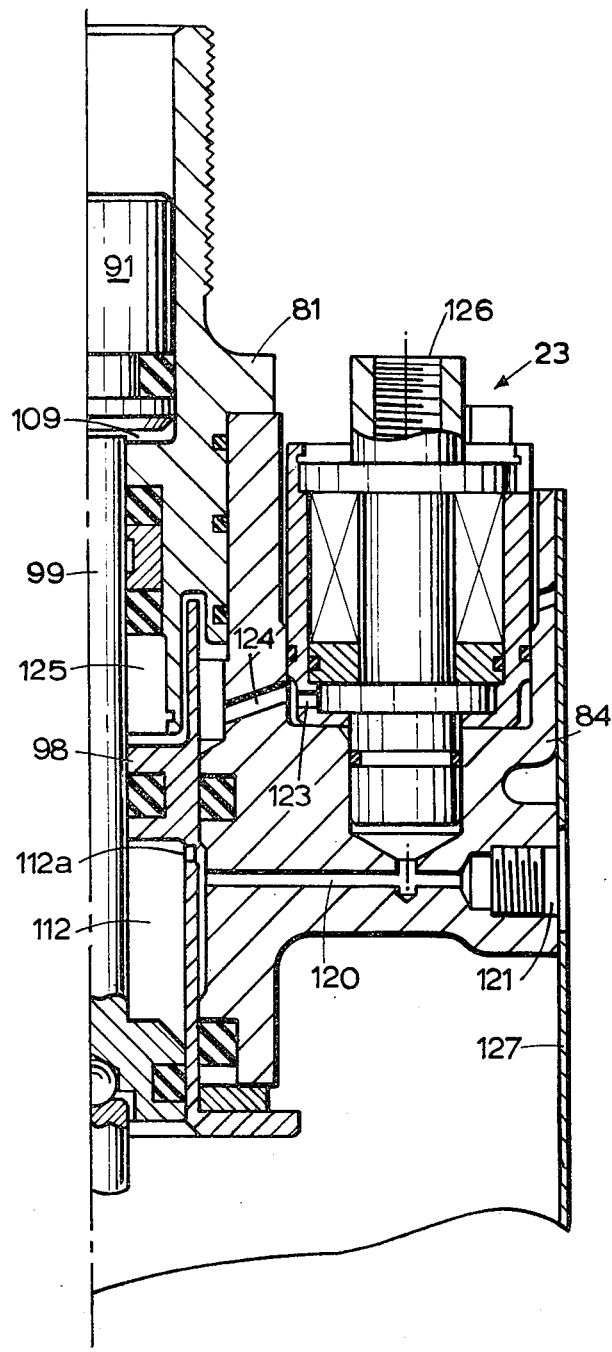
FIG. 10 is a part section on the lines 10—10 of FIG. 8.
FIG. 11 is a part section on the lines 11—11 of FIG. 8.

A radial inlet port 106 (FIG. 11) in the second housing part 84 is connected to an inlet valve 107 controlling fluid flow into a bore 92, the valve being normally held open by modulator piston 93 (not shown in FIG. 9). A passage 108 through both housing parts leads from the bore 92 to a pressure space 109 behind actuating piston 91. Another passage 110 (FIG. 9) through both housing parts connects chamber 109 with the other bore 92, and with an outlet port 111. The inlet port 106 is adapted to the connected to one of the pipelines 15 or 19 from control valve 14 and the outlet port 111 is adapted to be connected to the inlet of a further actuator 16 of another brake. Alternatively the outlet can be plugged. Thus when the control valve 14 is operated hydraulic fluid enters space 109 to move piston 91 and actuate the wheel brake.

Pistons 93 are normally held in their advanced positions by fluid pressure in the chamber 112 (the first) formed between modulator piston 98 and the second actuating piston 99. Radial openings 112a in piston 98 connect chamber 112 to an annular recess in bore 86, the same fluid pressure holding the second actuating piston in a retracted position against the force of four springs 113. Each spring 113 is coiled around a guide 114 screwed into a rearwardly extending portion of a clamping bolt 90, the spring acting between a radial flange 115 at the rear end of the guide and the forward end of a cage 116 is slidably mounted on the bolt. The rear end of the cage 116 is mounted in a ribbed end plate 117 which is itself retained on a threaded axially extending bolt 118 screwed into the end of the second actuating piston 99. A captive ball 119 in the end of piston 99 provides a bearing for the end of bolt 118.

High pressure fluid is normally admitted into chamber 112 via a passage 120 (FIG. 10) in the housing 84 connecting bore 86 with an inlet port 121 of a solenoid control valve 23 secured to the housing part 84. The solenoid valve 23 controls the flow of fluid to an outlet 123 communicating with a passage 124 in the housing 84 leading to a chamber 125 (the second) formed between modulator piston 98 and the end of housing part 81. A second outlet 126 from solenoid valve is adapted to be connected to reservoir line 28 or 30. In the normal state of the valve the first and second outlets are in communication. A cover 127 attached to housing part 84 surrounds the springs 113 and the solenoid valve 23.

During normal operation of the brakes the relative positions of the parts of the actuator assembly are as shown in FIG. 9, pressure fluid in chamber 112 keeping the second actuator piston 99 retracted in opposition to the force in springs 113 and keeping the first modulator piston 98 in abutment with the second modulator pistons 93 to hold the inlet valve 107 open.

When the deceleration of the braked wheel exceeds the predetermined threshold value the solenoid valve 23 is energized to close the connection between the chamber 125 and reservoir, and to allow pressure fluid from chamber 112 and inlet 121 into chamber 125. Modulator piston 98 retracts as the differential pressure across it is equalised and as braking pressure acting on pistons 93 acts on piston 98 through flange 97. The second actuating piston 99 will advance into space 109 but the braking pressure in this space will be sufficient to limit its forward movement. Retraction of pistons 93 shuts the inlet valve 107 to isolate space 109 from the applied pressure and the increase of fluid volume in bores 92 causes a fall in braking pressure.

In the event of a pressure failure in the anti-skid system or when the hand brake is applied, pressure in chamber 112 falls and the second actuating piston 99 moves forwardly to engage the first actuating piston 91 and apply the brake. In order to release the brake in this condition without the assistance of fluid pressure, the bolt 118 is rotated to allow the actuating piston 99 to retract without recompressing the springs 113. The ball 119 facilitates rotation of bolt 118.

We claim:

1. An actuator assembly for a vehicle brake comprising a housing provided with an inlet for connection to a supply of hydraulic fluid under pressure, first and second actuating members working in said housing, said first actuating member being adapted to apply a mechanical force to said brake and being bounded by a pressure space communicating with said inlet whereby said mechanical force is responsive to changes in hydraulic pressure in said pressure space, resilient means biassing said second actuating member to engage said first actuating member to apply an actuating force to said brake, means for subjecting said second actuating member to fluid pressure in opposition to said resilient means to hold said second member out of engagement with said first member, and modulating means for modulating the pressure of fluid in said pressure space, said modulating means comprising an inlet valve controlling communication between said inlet and said pressure space, a modulator piston assembly movable in said housing between a first position in which said inlet valve is open and a second position in which said inlet valve is closed, means for subjecting said modulator piston assembly to fluid pressure to urge it into the first position, and means for subjecting said modulator piston to fluid pressure to urge it into the second position.

2. An actuator assembly as in claim 1 wherein said modulator piston assembly includes a piston having a stepped through bore in which works a stepped piston forming said second actuating member, a chamber being defined between the two pistons, the arrangement being such that pressure fluid introduced into said chamber urges said modulator piston into the first position and said second actuating piston away from said first actuating member to compress said resilient means.

3. An actuator assembly as in claim 2 including means for connecting said chamber to a second chamber in the housing on the opposite side of said modulator piston, whereby, in a vehicle, a control valve responsive to the deceleration of a braked wheel of the vehicle controls the connection between said chambers.

4. An actuator assembly as in claim 3 including a control valve controlling said fluid connection between said first and second chambers.

5. An actuator assembly as in claim 3 wherein said pressure space is connected to a cylinder bore in which said modulator piston assembly is movable, movement of said piston assembly to the second position increasing the effective volume of said pressure space to relieve the braking pressure.

6. An actuator assembly as in claim 5 wherein said modulator piston assembly comprises a first modulator piston which defines said first chamber, which is movable in a bore in communication with said second chamber, and which acts on a second modulator piston movable in the bore communicating with said pressure space.

7. An actuator assembly as in claim 6 wherein said first actuating member is also a piston axially aligned with said first modulator piston and said second actuating piston.

8. An actuator assembly as in claim 7 wherein said second modulator piston works in a bore parallel to said first modulator piston, a radial extension from said first modulator piston engaging said second modulator piston, and said housing being provided with a passage communicating between said bore and said pressure space.

9. An actuator assembly as in claim 8 wherein there are two second modulator pistons angularly spaced around said first modulator piston.

10. An actuator assembly as in claim 9 wherein said housing is provided with an outlet communicating with said pressure space.

11. An actuator assembly as in claim 8 wherein said housing is in two parts, a first part and a second part, and said stepped second actuating piston has a smaller diameter portion terminating at its step, the first part defining a bore for said first actuating piston and a bore for the smaller diameter portion of said second actuating piston, the second part defining bores for said first and second modulator pistons, the two housing parts being held together by bolts locating a plurality of springs acting on said second actuating piston.

12. An actuator assembly as in claim 7 wherein said second modulator piston works in a bore coaxial with the bore of said first modulator piston.

13. An actuator assembly as in claim 12 wherein said first and second modulator pistons are combined in a stepped piston, said second chamber being formed at the step in diameter, and said third chamber being defined between the end of said second modulator piston and said first actuating piston.

14. An actuator assembly as in claim 13 wherein said fluid inlet to said first chamber comprises a passage through the larger diameter portion of said second actuating piston.

15. An actuator assembly as in claim 12 wherein said resilient means acts between said housing and a cage secured to said second actuating piston, said cage being slidable on a bearing surface provided on said housing.

16. An actuator assembly as in claim 1 wherein said resilient means is a single spring.

17. An actuator assembly as in claim 1 wherein said resilient means is a plurality of angularly spaced springs.

18. An actuator assembly as in claim 1 wherein said resilient means acts on a member having an adjustable connection with said second actuating member.

19. An actuator assembly as in claim 1 in which said means subjecting said second actuating member to fluid pressure in opposition to said resilient means comprises said means subjecting said modulator piston assembly to fluid pressure to hold said modulator piston in the first position.

* * * * *